(No Model.)

J. L. CRAWFORD.
WHIP ATTACHMENT FOR HORSE POWERS.

No. 254,619. Patented Mar. 7, 1882.

WITNESSES:
C. Neveux
C. Sedgwick

INVENTOR:
J. L. Crawford
BY Munn & Co.
ATTORNEYS.

UNITED STATES PATENT OFFICE.

JOHN L. CRAWFORD, OF PINE GROVE, MISSISSIPPI.

WHIP ATTACHMENT FOR HORSE-POWERS.

SPECIFICATION forming part of Letters Patent No. 254,619, dated March 7, 1882.

Application filed December 6, 1881. (No model.)

*To all whom it may concern:*

Be it known that I, JOHN L. CRAWFORD, of Pine Grove, Benton county, Mississippi, have invented a new and Improved Whip Attachment for Horse-Powers, of which the following is a full, clear, and exact description.

Reference is to be had to the accompanying drawings, forming part of this specification, in which similar letters of reference indicate corresponding parts in both figures.

Figure 1:
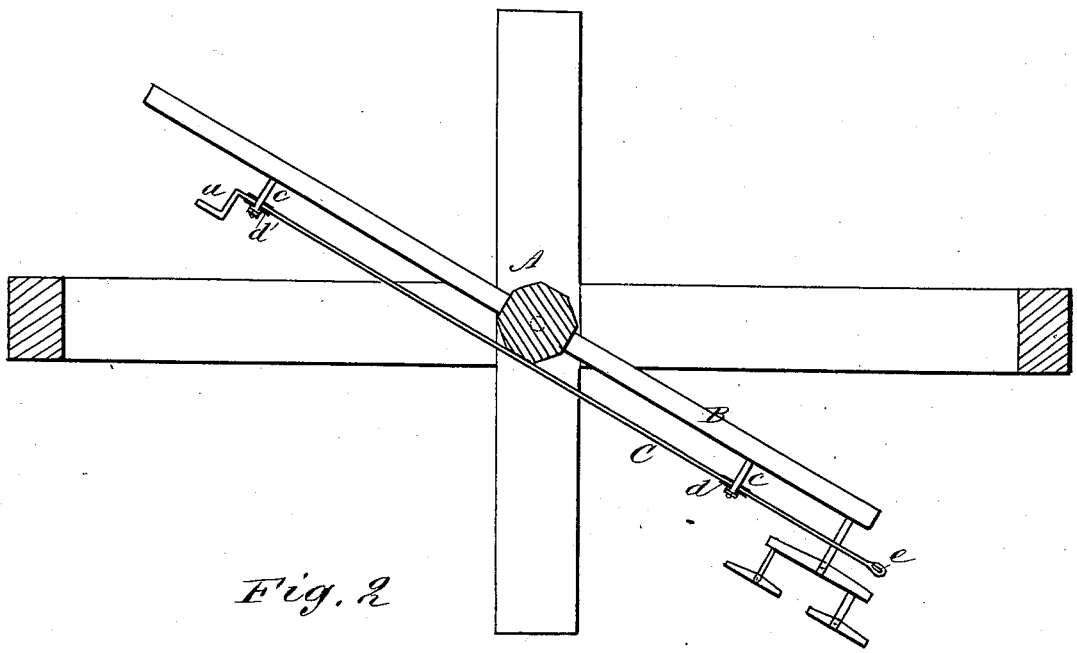
Figure 2:
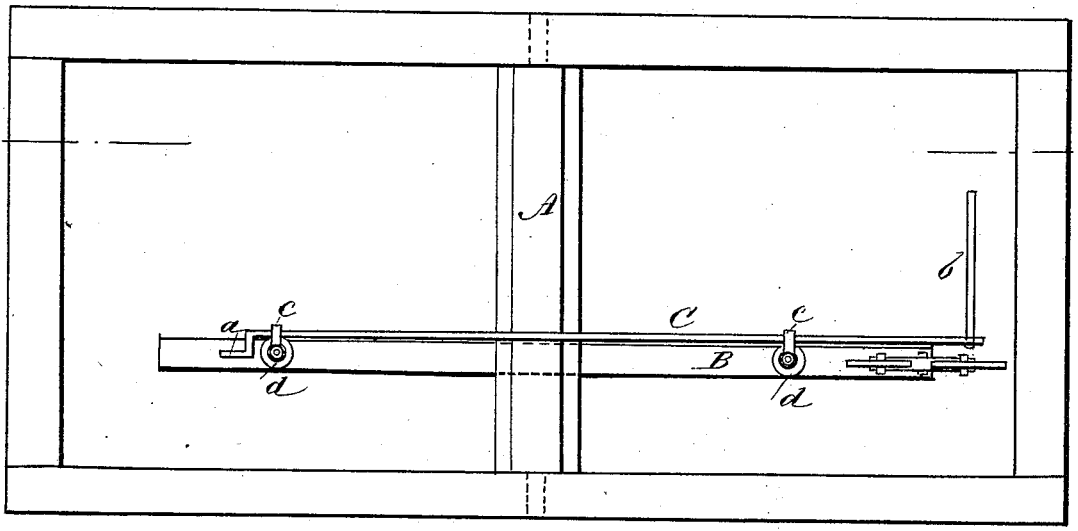

Figure 1 is a sectional plan of a horse power having my invention attached, and Fig. 2 is a side elevation of the same.

This invention consists of a rod having a crank at one end and a whip at the other, the rod being attached to the lever to which the horses are attached, the rod being adapted to be moved longitudinally to bring the whip into position for whipping either horse.

A represents the king-post of the horse-power. B represents the lever to which the horses are attached, and C represents the whip-rod, which has the crank $a$ at one end and the whip $b$ at the other. This rod is secured upon the side of the lever B by means of the yokes $c\ c$. These yokes are provided with the guttered friction-wheels $d\ d$, against which the rod C moves. The whip is attached to the rod by being passed through the slot $e$, made through the rod for the purpose of holding the whip, so that it may be removed when desired.

In use the rod is first to be moved in the yokes, so that the whip will come in rear of the horse which needs whipping up, and then turned quickly by the crank, so that the whip will deliver its blows. To whip the other horse it is only necessary to move the rod again in the yokes, so as to bring the whip in the proper position for hitting the other horse, as will be readily understood.

Having thus described my invention, I claim as new and desire to secure by Letters Patent—

1. The whipping attachment for horse-powers herein shown and described, consisting of the rod C, formed with the crank $a$, and adapted to carry the whip $b$, substantially as described.

2. The lever B, provided with the yokes $c\ c$, which carry the wheels $d\ d$, in combination with the crank-rod C and the whip $b$, the rod being adapted to be moved longitudinally, as and for the purposes set forth.

JOHN L. CRAWFORD.

Witnesses:
C. T. BLAKSLIE,
J. N. MCDONALD.